United States Patent Office 3,061,587
Patented Oct. 30, 1962

3,061,587
ORDERED ORGANO SILICON-ALUMINUM OXIDE COPOLYMERS AND THE PROCESS OF MAKING SAME
John B. Rust and Hideyo H. Takimoto, Los Angeles, Calif., assignors to Hughes Aircraft Company, Culver City, Calif., a corporation of Delaware
No Drawing. Filed May 3, 1960, Ser. No. 26,405
16 Claims. (Cl. 260—46.5)

The present invention relates to copolymers containing an ordered arrangement of silicon and aluminum atoms, especially silicon-aluminum oxide copolymers containing regularly ordered repeating units along the polymer chain, and the method of making such copolymers.

Copolymers of aluminum oxide and silicones have been described, heretofore, in the prior art. All of these copolymers have been produced by processes leading to random entry of the silicone and the aluminum oxide into the polymer molecule, or have resulted in the production of merely physical mixtures. Although, in many cases products of improved utility have been obtained, the excellent properties which are inherent in copolymers containing an Si—O—Al—O repeating unit could not be realized. The prior art copolymers contain the units Si—O—Si—O and Al—O—Al—O as well as regularly ordered units and physical mixtures of the two polymers which cannot be classed as true copolymers. The occurrence of these structures is random and unpredictable.

Accordingly, it is an important object of this invention to provide a new polymer system of unique and enhanced properties of thermal stability and chemical resistance, particularly to hydrolytic degradation.

Another object is to provide copolymer compositions which are useful as molding, laminating, and casting resins, as protective coatings, adhesives, and insulating varnishes.

We have now unexpectedly discovered that it is possible to secure copolymers containing exclusively the regular repeating Si—O—Al—O unit and that these new copolymers possess many unique properties not present in the randomly copolymerized materials of the prior art. Furthermore, prior art disclosures have been concerned with copolymers of silicone with aluminum oxide produced by condensing a soluble aluminum ester with an already formed silicone or by cohydrolyzing the aluminum ester with a hydrolyzable organosubstituted silane. The result has been that either highly crosslinked products were formed, or compositions obtained which still contained readily hydrolyzable groups attached to the aluminum or silicon, or physical mixtures were produced. It is not possible to produce thermally stable linear copolymers, or linear copolymers that are stable to hydrolytic degradation by prior art methods. Furthermore, control of the copolymerization reactions by methods of the prior art is exceedingly difficult or impossible in many cases, requiring that only very small percentages of aluminum oxide could be employed.

The process of producing the copolymers of the present invention can be graphically illustrated by the following reaction:

$R_2Si(OOCR')_2 + R''_3SiOAl(OR''')_2 \longrightarrow$

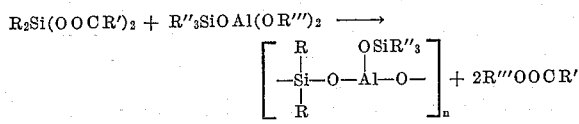
$+ 2R'''OOCR'$

We have found that this reaction, which has several variations which will become apparent from the more detailed description given hereinafter, will always produce a regularly ordered silicon-aluminum copolymer. Thus, when conducted properly as will be described in the illustrative examples, there are substantially no side reactions and a polymer chain containing the regularly ordered repeating unit of Si—O—Al—O will be produced. Under the reaction conditions used, the reaction of $R_2Si(OOCR')_2$ with similar molecules to yield Si—O—Si—O, and the reaction of $R''_3SiOAl(OR''')_2$ with similar molecules to yield Al—O—Al—O, occur only to a very minor degree.

In the above equation, describing the process of producing the copolymers of the present invention, the reactants can be more generally expressed as $R_xSi(OOCR')_{4-x}$ and $(R''_3SiO)_yAl(OR''')_{3-y}$ where $x$ is an integer from 1 to 3, and $y$ is an integer from 1 to 2.

The variations of the above reaction, in general, fall into two classes: (1) chain limiting reactions, and (2) crosslinking reactions. These two classes can be graphically represented by the following typical reactions:

(1) CHAIN LIMITING REACTIONS (a)
$(n-1)R_2Si(OOCR')_2 + nR''_3SiOAl(OR''')_2 + 2R_3SiOOCR' \longrightarrow$
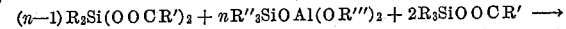
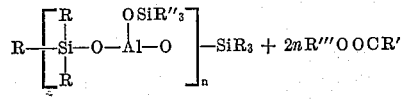
$-SiR_3 + 2nR'''OOCR'$ (b)
$nR_2Si(OOCR')_2 + (n-1)R''_3SiOAl(OR''')_2 + 2(R''_3SiO)_2AlOR''' \longrightarrow$
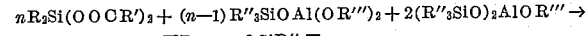
$(R''_3SiO)_2AlO-$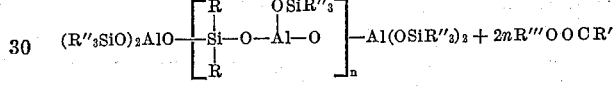$-Al(OSiR''_3)_2 + 2nR'''OOCR'$ (2) CROSSLINKING REACTIONS (a)
$2nR_2Si(OOCR')_2 + 2nR''_3SiOAl(OR''')_2 + RSi(OOCR')_3 \longrightarrow$
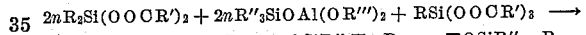
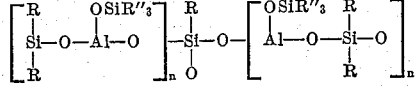

(b)
$2nR_2Si(OOCR')_2 + 2nR''_3SiOAl(OR''')_2 + Al(OR)'''_3 \longrightarrow$
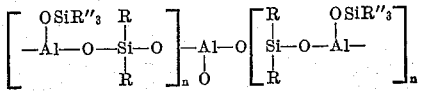

The copolymers of the present invention can be prepared with any desired molecular weight and form, depending upon the reaction conditions, stoichiometry, and character of the R and R'' groups. In general, the initial polymers of this invention have the form of:

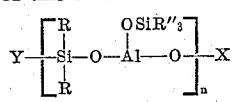

where X may be —OR''',

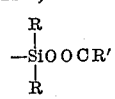

and Y may be

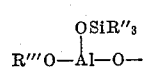

and R'COO—. This, of course, is not true if chain limiters are used; in this case the chain ends being as illustrated in (1) above. In all these typical reactions, including the basic reaction for the preparation of the polymers of this invention, it is also possible to use intermediates of the form:

$R_2Si(OR''')_2$ and $R''_3SiOAl(OOCR')_2$

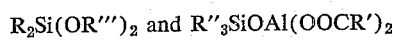

In order to produce polymers of the present invention having the desired properties, it is essential that the intermediates be synthesized in a substantially pure form. The silane derivatives can be made and purified by any suitable means well-known to those skilled in the art. The triorganosubstituted siloxy aluminum derivatives, we have found, are best prepared according to the following reactions:

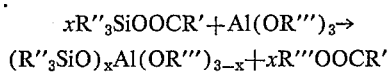

$$xR''_3SiOOCR' + Al(OR''')_3 \rightarrow (R''_3SiO)_xAl(OR''')_{3-x} + xR'''OOCR'$$

where $x = 1$ or 2.

In all of the above reactions R and R'' can be any suitable alkyl, aralkyl, aryl, or mixed alkyl and aryl, such as methyl, ethyl, propyl, butyl, isopropyl, sec. butyl, octyl, and the like or benzyl, methyl benzyl, α-phenyl ethyl, β-phenyl ethyl, α-phenyl propyl, etc., or phenyl, naphthyl, diphenyl, tolyl, xylyl, and the like. R' and R''' can be alkyl, aralkyl, or aryl; however, these groups are preferably of low molecular weight such as having preferably less than about eight carbon atoms per group, so that the ester which is eliminated during the reaction has sufficient volatility so that it can be removed by distillation at ambient or reduced pressure. These groups can be methyl, ethyl, propyl, benzyl, phenyl, and the like.

The polymers of the present invention can be polymerized further by hydrolysis of the end groups X and Y of the polymers illustrated above. A typical and possible structure for the hydrolytically polymerized materials can be illustrated by:

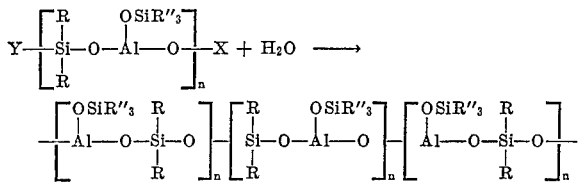

It has been found that the compositions of this invention are useful as modifying resins for a variety of well-known resinous material, such as phenol-formaldehyde resins, drying oil alkyd resins, silicone resins, epoxy resins, polyester resins, and the like.

The polymers of the present invention also can be used alone or in admixture with fillers and reinforcing agents, the proper choice of which depending upon the end use of the composition. As fillers there can be used glass fibers, clays, pigments, such as iron oxide, zinc oxide, aluminum oxide, titanium dioxide, litharge, etc. Although the compositions of this invention can be advanced or cured by the application of heat, catalysts can be employed such as metallic salts of carboxylic acids, quaternary ammonium salts of carboxylic acids, metallic oxides, amines, organic peroxides, and the like.

The products of this invention which contain reactive end groups can be used to great advantage to prepare modifications of a variety of resinous materials of enhanced thermal properties, mechanical strength at elevated temperatures, weathering resistance and the like. The reactive end groups of our polymers are capable of reacting with alcohol and acid groups on resinous products such as alkyd resins, with phenolic hydroxyl groups, with esters by interchange, with drying oil fatty acids, with silicone hydroxyl groups, with amine groups, and epoxy groups as well as many other reactive sites on other polymer molecules. By reacting with these resinous compositions, the polymers of this invention become a chemical part of the resinous composition, and thus impart desirable and unique properties to these modified compositions.

The following examples are given to illustrate the copolymers and compositions of this invention, the process of making them, the intermediates from which the copolymers are made, and the uses of the copolymers. These examples are not to be construed as limiting to the scope of this invention in any manner.

*Example I*

As an example of the preparation of intermediates useful in the synthesis of polymers containing silicon and aluminum, the following procedure is illustrative:

To 40.8 grams of triisopropoxyaluminum dissolved in 175 ml. of toluene, 26.4 grams of trimethylacetoxysilane was added. The clear solution was refluxed for five hours, after which time the condensation product, isopropyl acetate, and the solvent was removed by distillation. The residual material was fractionated under reduced pressure to give 22.5 grams of trimethylsiloxydiisopropoxy-aluminum boiling at 122.5–124°C./4–5 mm. The viscous, oily, colorless liquid upon standing for two days at room temperature crystallized to a white solid which was extremely sensitive to moisture.

*Example II*

An equimolar quantity of dimethyldiacetoxysilane was added slowly to trimethylsiloxydiisopropoxyaluminum dissolved in toluene. An evolution of considerable amount of heat was observed. The reaction mixture remained clear and water white even after the addition of the acetoxysilane. After stirring at room temperature for two hours, the reaction mixture was heated to remove the isopropyl acetate and the solvent. A viscous, pale yellow polymer was obtained which was soluble in toluene and dimethylformamide. The material could be cast into a film which became insoluble and infusible upon prolonged heating at 200° C.

*Example III*

Dimethylidiacetoxysilane (35.2 grams) was added to a mixture of 44.5 grams of trimethylsiloxydiisopropoxyaluminum and 5.3 grams of bis(trimethylsiloxy)isopropoxy-aluminum dissolved in 200 ml. of toluene. After the exothermic reaction had subsided, the clear solution was stirred for three hours. The condensation product, isopropyl acetate, and the solvent was distilled off, leaving a viscous white residue. Further heating in the absence of air effected little change in the appearance of the polymer. This material was soluble in the common organic solvents such as toluene. Upon casting a film and heating to above 200° C. for a long period of time, further cure was obtained.

*Example IV*

To 70.2 grams of trimethylsiloxydiisopropoxyaluminum dissolved in 200 ml. of toluene was added 44.0 grams of methyltriacetoxysilane. The reaction mixture became cloudy and heat was evolved. Stirring at room temperature was continued for two hours. A white precipitate appeared on the bottom of the flask. The condensation product and the solvent were removed first by distillation at atmospheric pressure and then under vacuum. The resulting crosslinked polymer was insoluble in aromatic solvents. The material exhibited excellent thermal stability showing essentially no loss in weight even upon prolonged heating at high temperatures.

*Example V*

To 4.08 grams of triisopropoxyaluminum 5.28 grams of dimethyldiacetoxysilane was added. Upon contact of the reactants, a noticeable heat of reaction was observed. The solid aluminum ester turned to a thick, white paste and the odor of isopropyl acetate was detected. The mixture was gently heated for one hour and the volatile materials were removed by distillation. The residual white powdery solid was insoluble in toluene. This polymer was also highly crosslinked as was that of Example IV.

*Example VI*

An equimolar quantity of diphenyldiacetoxysilane was added to trimethylsiloxydiisopropoxyaluminum. The mixture was heated to yield a clear melt and the heating was continued for three hours. The volatile material, isopropyl acetate, formed in the condensation reaction, was then removed. The residual material was a viscous, yellow polymer soluble in aromatic solvents. Prolonged heating of a film cast from a solution of this material resulted in a further cure and the polymer became insoluble.

*Example VII*

A mixture of triisopropoxyaluminum (9.0 grams) and diphenyldiacetoxysilane (4.1 grams) was heated for two hours. A clear melt was obtained initially, but after a few minutes a precipitation of a white solid was observed. During this heating period, the odor of isopropyl acetate was detected. The volatile material was removed by heating under a vacuum to yield a yellow crosslinked polymer. This product was insoluble in the common organic solvents.

What is claimed is:

1. A process for the production of an ordered organosiloxy aluminum oxide polymer comprising reacting, by organic ester elimination under substantially anhydrous conditions, an organo acyloxy silane having the general formula $R_nSi(OOCR')_{4-n}$ with an aluminum compound selected from the group consisting of trialkoxy aluminum and triorganosiloxy dialkoxy aluminum having the general formula $(R''_3SiO)Al(OR''')_2$ wherein R and R'' are hydrocarbon radicals selected from the class consisting of alkyl, aryl, aralkyl, and alkaryl, wherein R' and R''' are hydrocarbon alkyl radicals and $n$ takes the integral values of 1 or 2.

2. A process for the production of an ordered organosiloxy aluminum oxide polymer comprising reacting, by organic ester elimination under substantially anhydrous conditions, an organo acyloxy silane having the general formula $R_nSi(OOCR')_{4-n}$ with a triorganosiloxy dialkoxy aluminum compound having the general formula $(R''_3SiO)Al(OR''')_2$ wherein R and R'' are hydrocarbon radicals selected from the class consisting of alkyl, aryl, aralkyl, and alkaryl, wherein R' and R''' are hydrocarbon alkyl radicals and $n$ takes the integral values of 1 or 2.

3. A process for the production of an ordered organosiloxy aluminum oxide polymer comprising reacting, by organic ester elimination under substantially anhydrous conditions, an alkyl acyloxy silane having the general formula $R_nSi(OOCR')_{4-n}$ with a trialkylsiloxy dialkoxy aluminum compound having the general formula $(R''_3SiO)Al(OR''')_2$ wherein R and R'' are hydrocarbon alkyl radicals selected from the group consisting of methyl, ethyl, butyl, amyl, and hexyl, wherein R' and R''' are hydrocarbon alkyl radicals and $n$ takes the integral values of 1 or 2.

4. A process for the production of an ordered organosiloxy aluminum oxide polymer comprising reacting, by organic ester elimination under substantially anhydrous conditions, an aryl acyloxy silane having the general formula $(R''_3SiO)Al(OR''')_2$ wherein R and R'' are hydrocarbon aryl radicals selected from the group consisting of phenyl, tolyl, xylyl, biphenylyl, and naphthyl, wherein R' and R''' are hydrocarbon alkyl radicals, and $n$ takes the integral values of 1 or 2.

5. A process according to claim 1 wherein R is a hydrocarbon aryl radical and R'' is a hydrocarbon aryl radical.

6. A process according to claim 1 wherein R is a hydrocarbon aryl radical and R'' is a hydrocarbon alkyl radical.

7. A process according to claim 1 wherein R is a hydrocarbon aryl radical and R'' is a hydrocarbon aralkyl radical.

8. A process according to claim 1 wherein R is a hydrocarbon alkyl radical and R'' is a hydrocarbon aralkyl radical.

9. A process according to claim 1 wherein R is a hydrocarbon alkaryl radical and R'' is a hydrocarbon alkyl radical.

10. A process according to claim 1 wherein R is a hydrocarbon aralkyl radical and R'' is a hydrocarbon alkyl radical.

11. A process for the production of an ordered organosiloxy aluminum oxide polymer comprising reacting, by organic ester elimination under substantially anhydrous conditions, dimethyl diacetoxysilane with trimethylsiloxy diisopropoxy aluminum.

12. A process for the production of an ordered organosiloxy aluminum oxide polymer comprising reacting, by organic ester elimination under substantially anhydrous conditions, dimethyl diacetoxy silane with a mixture of trimethylsiloxy diisopropoxy aluminum and bis(trimethylsiloxy) isopropoxy aluminum.

13. A process for the production of an ordered organosiloxy aluminum oxide polymer comprising reacting, by organic ester elimination under substantially anhydrous conditions, methyl triacetoxy silane with trimethylsiloxy diisopropoxy aluminum.

14. A process for the production of an ordered organosiloxy aluminum oxide polymer comprising reacting, by organic ester elimination under substantially anhydrous conditions, dimethyl diacetoxy silane with triisopropoxy aluminum.

15. A process for the production of an ordered organosiloxy aluminum oxide polymer comprising reacting, by organic ester elimination under substantially anhydrous conditions, diphenyl diacetoxy silane with trimethylsiloxy diisopropoxy aluminum.

16. A process for the production of an ordered organosiloxy aluminum oxide polymer comprising reacting, by organic ester elimination under substantially anhydrous conditions, diphenyl diacetoxy silane with triisopropoxy aluminum.

References Cited in the file of this patent

UNITED STATES PATENTS

| | | |
|---|---|---|
| 2,512,063 | Kreidl et al. | June 20, 1950 |
| 2,645,654 | Hyde | July 14, 1953 |
| 2,682,507 | Agens | June 29, 1954 |
| 3,002,986 | Hyde | Oct. 3, 1961 |

OTHER REFERENCES

Andrianow et al.: Jour. of Polymer Science, vol. XXX (1958), pages 513–514.